March 2, 1926.
S. FISCHER
CHAIN CONNECTER
1,574,961
Filed Feb. 12, 1924
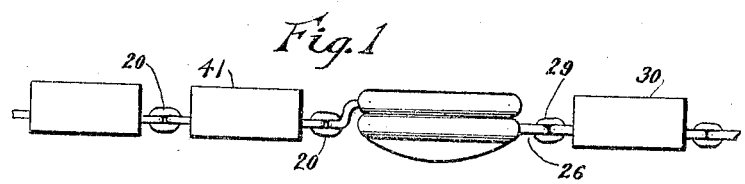
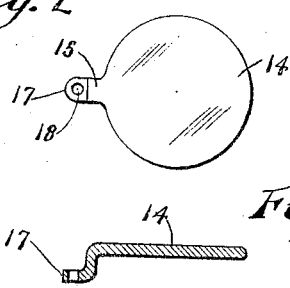
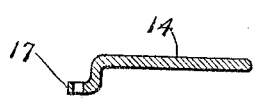
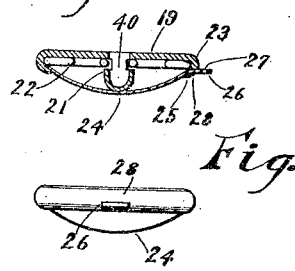
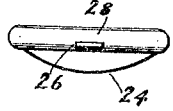
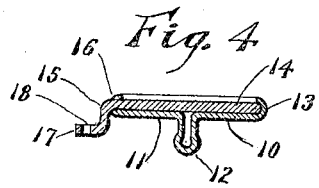
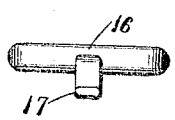
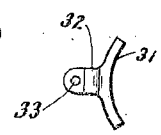
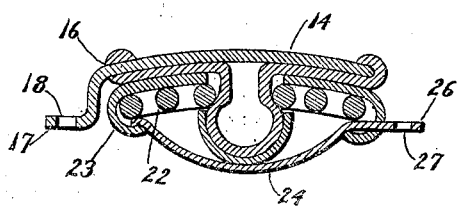
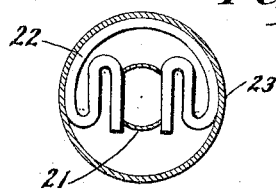
Inventor
Sigmund Fischer
By Barlow & Barlow
Attorneys Patented Mar. 2, 1926.

1,574,961

UNITED STATES PATENT OFFICE.

SIGMUND FISCHER, OF PROVIDENCE, RHODE ISLAND.

CHAIN CONNECTER.

Application filed February 12, 1924. Serial No. 692,246.

*To all whom it may concern:*

Be it known that I, SIGMUND FISCHER, a citizen of the United States, residing at Providence, in the county of Providence and State of Rhode Island, have invented certain new and useful Improvements in Chain Connecters, of which the following is a specification.

This invention relates to a connecter for releasably attaching together the ends of a chain, and the like; and the object of this invention is to provide such a connecter which consists of cooperating stud and socket members, each having an eye portion adapted to be attached to an end element of the chain for connecting these ends together.

A further object of this invention is the provision of a connecter comprising stud and socket members adapted to be snapped together, each member having an eye portion having their attaching parts in substantially the same plane, whereby oppositely directed strains on the chain ends will not tend to tip the connecter members out of a plane substantially parallel to that of the chain.

With these and other objects in view, the invention consists of certain novel features of construction, as will be more fully described, and particularly pointed out in the appended claims.

In the accompanying drawings:

Figure 1 is an edge view showing my stud and socket connecter members as attached to each other and the links of the opposite ends of the chain connected to the opposite ends of this connecter.

Figure 2 is a detail of one of the plate members as provided with an attaching eye.

Figure 3 is an edge view showing the attaching eye portion as offset at an angle to the plane of the plate.

Figure 4 is a sectional side elevation of the stud member showing the plate with its eye-member attached thereto.

Figure 5 is a front view of this stud member showing the eye-member as extending through the side wall of the same.

Figure 6 is a sectional edge view showing the socket member with the spring mounted therein also with the plate member mounted therein and having an eye-member extending from the edge thereof.

Figure 7 is an edge view showing the eye-member as extending through the side wall of the socket plate.

Figure 8 is a top view of the eye-plate as disconnected from the socket plate.

Figure 9 is an enlarged sectional elevation showing the stud member as connected to the socket member.

Figure 10 is a view showing an eye member as provided with a T-shaped head adapted to be secured to either of the stud or socket members.

Fig. 11 is a sectional plan view of the socket member.

It is found in practice of advantage, to provide a connecter for the ends of chains especially those worn for personal adornment, and in such a connecter to provide stud and socket members adapted to be snapped together. The general shape of these members may be such as to conform to the general shape of the links of the chain and to lie flat similarly to the other links of the chain; also it is found desirable to provide eye-members which may preferably extend in opposite directions and be disposed in substantially the same plane so that a strain in opposite directions on the chain will not tip the connecter out of its normal plane or a plane which may be substantially that of the rest of the links; also by providing a connecter of this character, the ends of the chain are securely connected together and may also be readily separated when desired; and the following is a detailed description of one construction of connecter by which these advantageous results may be accomplished:—

With reference to the drawings, 10 designates the stud member of the connecter, which is preferably formed with a back plate 11 having a stud or projecting portion 12 formed from the plate, and this plate being herein shown as having upturned edge walls 13 which I have shown as retaining a second plate 14.

This second plate 14 is provided with a laterally extending eye portion or tongue 15 which projects through an opening 16 in the upturned edge wall of the bottom plate, and this eye-member is herein shown as being turned downwardly at substantially a right angle to the plane of the face of its plate and then its end 17 is turned off at a right angle and is provided with an opening 18 near its end into which a ring 20 of a connecting member of the chain may be passed to attach the next adjacent link 41 of the chain end thereto.

The socket member of this connecter is constructed of a plate 19 having a central recess or pocket 40 formed in it, the side walls 21 of this pocket being cut away to permit the clamping spring 22 to extend therethrough to grip and yieldingly retain the head of the stud 12 when pressed thereinto.

This plate 19 is provided with an outwardly-turned annular flange 23 and a back plate 24 is inserted within this flange and secured in position by turning the edge 25 of the flange thereover. This back plate is provided with an eye-tongue 26 having an opening 27 therein and this tongue extends through a corresponding opening 28 in the flange wall of the plate 19 and a ring 29 may be passed through the tongue opening 27 to connect the end link 30 of the chain to this eye-member.

In some instances instead of providing a plate 24 to cover the back of the socket member, I may form an eye-member, as illustrated in Figure 10, with the T-shaped head 31 and a shank 32 having an eye 33 through which the ring 29 may extend to attach the bracelet link 30 thereto.

I have shown and described an eye-member as attached to a plate which is secured in position by the walls of the stud and socket plates but these eye-members may be connected to the respective members of the connecter by any suitable means to extend outwardly therefrom in opposite directions to serve as a convenient means for attaching the opposite ends of the chain to the opposite end of the connecter.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A chain connecter comprising a socket member having a stud gripping spring mounted therein, a stud member superimposed upon the socket member and having an enlarged head portion to snap through said spring into the socket portion beyond said spring, said stud and socket members having oppositely-disposed laterally extending attaching eye members both disposed in a plane substantially at the center of the enlargement of said head portion of the stud.

2. A chain connecter comprising cooperating stud and socket members adapted to be separably connected together, each of said members having a plate with edge walls, a second plate secured in each member by said edge walls, and an eye portion formed on the edge of each of said plates to which links of opposite ends of the chain may be connected.

3. A chain connecter comprising cooperating stud and socket members adapted to be separably connected together, each of said members having a plate with edge wall, a second plate secured in each of said members by said edge wall, an eye on each of said second plates extending through said edge wall into position to be engaged by the opposite ends of the chain.

4. A chain connecter comprising cooperating stud and socket members adapted to be separably connected together, each of said members having a plate with an edge wall, a second plate secured in each of said members by said edge wall, an eye on each of said second plates extending through said edge wall, one of said eyes being offset from the plane of said second plate and disposed in substantially the plane of the eye on the opposite member.

In testimony whereof I affix my signature.

SIGMUND FISCHER.